(12) United States Patent
Bourne et al.

(10) Patent No.: US 10,745,118 B2
(45) Date of Patent: Aug. 18, 2020

(54) VARIABLE RATIO GEARBOX FOR A ROTARY WING AIRCRAFT TAIL ROTOR

(71) Applicant: SIKORSKY AIRCRAFT CORPORATION, Stratford, CT (US)

(72) Inventors: Frederick L. Bourne, Litchfield, CT (US); Timothy F. Lauder, Oxford, CT (US); Nicholas D. Lappos, Guilford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 353 days.

(21) Appl. No.: 15/679,840

(22) Filed: Aug. 17, 2017

(65) Prior Publication Data
US 2018/0086443 A1 Mar. 29, 2018

Related U.S. Application Data

(60) Provisional application No. 62/398,833, filed on Sep. 23, 2016.

(51) Int. Cl.
| | | |
|---|---|---|
| *B64C 27/12* | (2006.01) | |
| *F16H 3/44* | (2006.01) | |
| *B64C 27/82* | (2006.01) | |
| *B64C 27/10* | (2006.01) | |
| *F16H 3/72* | (2006.01) | |

(52) U.S. Cl.
CPC ............... *B64C 27/12* (2013.01); *F16H 3/44* (2013.01); *B64C 27/10* (2013.01); *B64C 27/82* (2013.01); *B64C 2027/8236* (2013.01); *F16H 3/724* (2013.01)

(58) Field of Classification Search
CPC ............ B64C 27/12; F16H 3/721; F16H 3/44
See application file for complete search history.

(56) References Cited

U.S. PATENT DOCUMENTS

| | | | | |
|---|---|---|---|---|
| 3,977,812 A | * | 8/1976 | Hudgins | ................. B64C 27/12 416/123 |
| 6,024,324 A | * | 2/2000 | Maino | .................... G01H 1/003 180/337 |
| 6,428,443 B1 | * | 8/2002 | Dischler | ................. B64C 27/12 475/343 |
| 6,612,195 B2 | * | 9/2003 | Gmirya | ................... B64C 27/14 244/17.19 |
| 7,296,767 B2 | * | 11/2007 | Palcic | ..................... B64C 27/10 244/17.11 |
| 7,651,050 B2 | * | 1/2010 | Lappos | ................... B64C 27/14 244/17.11 |
| 8,992,361 B2 | | 3/2015 | Doleschel et al. | |
| 9,085,225 B2 | | 7/2015 | Halwes | |
| 9,243,700 B1 | * | 1/2016 | DeBoth | ............... F16H 37/0826 |

(Continued)

*Primary Examiner* — Brian M O'Hara
*Assistant Examiner* — Michael B. Kreiner
(74) *Attorney, Agent, or Firm* — Cantor Colburn LLP

(57) ABSTRACT

A rotary wing aircraft including a prime mover, a main rotor assembly having a first plurality of rotor blades operatively coupled to a main rotor shaft rotatable at a first speed ratio, a tail rotor assembly including a second plurality of rotor blades operatively coupled to a tail rotor shaft rotatable at a second speed ratio, and a variable ratio gearbox assembly mechanically connected to the tail rotor assembly. The variable ratio gearbox assembly operates to selectively vary the second speed ratio relative to the first speed ratio.

16 Claims, 6 Drawing Sheets

(56) References Cited

U.S. PATENT DOCUMENTS

| | | | | |
|---|---|---|---|---|
| 9,290,266 B2* | 3/2016 | Robertson | ............... | F16H 3/724 |
| 9,393,858 B2 | 7/2016 | Halwes | | |
| 2006/0266883 A1* | 11/2006 | Gmirya | ................... | B64C 27/10 |
| | | | | 244/60 |
| 2008/0173752 A1* | 7/2008 | Palcic | ..................... | B64C 27/10 |
| | | | | 244/17.11 |
| 2008/0315035 A1* | 12/2008 | Lappos | ................... | B64C 27/14 |
| | | | | 244/60 |
| 2010/0044498 A1* | 2/2010 | Palcic | ..................... | B64C 27/10 |
| | | | | 244/17.21 |
| 2013/0157800 A1* | 6/2013 | Ward | ...................... | F16H 3/721 |
| | | | | 475/311 |
| 2017/0234421 A1* | 8/2017 | Poster | .................... | F16H 57/08 |
| | | | | 475/331 |

* cited by examiner

VARIABLE RATIO GEARBOX FOR A ROTARY WING AIRCRAFT TAIL ROTOR

CROSS REFERENCE TO RELATED APPLICATIONS

The present invention claims priority to U.S. Provisional Application Ser. No. 62/398,833, filed Sep. 23, 2016, the contents of which are incorporated herein by reference in their entirety.

BACKGROUND

Exemplary embodiments pertain to the art of rotary wing aircraft and, more particularly, to a variable ratio gearbox for a rotary wing aircraft.

Rotary wing aircraft typically include a main rotor assembly and a tail rotor assembly. The main rotor assembly may provide desired lift while the tail rotor assembly may provide orientation control (yaw) and/or forward propulsion. Typically one or more prime movers, often in the form of internal combustion engines, provide power that drives the main rotor assembly and the tail rotor assembly. A gearbox mechanically links the one or more prime movers with the main rotor assembly and the tail rotor assembly. Currently, the tail rotor assembly is driven at a fixed ratio relative to the main rotor speed.

BRIEF DESCRIPTION

Disclosed is a rotary wing aircraft including a prime mover, a main rotor assembly having a first plurality of rotor blades operatively coupled to a main rotor shaft rotatable at a first speed ratio, a tail rotor assembly including a second plurality of rotor blades operatively coupled to a tail rotor shaft rotatable at a second speed ratio, and a variable ratio gearbox assembly mechanically connected to the tail rotor assembly. The variable ratio gearbox assembly operates to selectively vary the second speed ratio relative to the first speed ratio.

In addition to one or more of the features described above or below, or as an alternative, further embodiments could include wherein the variable ratio gearbox assembly includes a planetary gear set having a sun gear, one or more planetary gears, a ring gear and an output member.

In addition to one or more of the features described above or below, or as an alternative, further embodiments could include a ring gear actuator operatively coupled to the ring gear, the ring gear actuator selectively enabling movement of the ring gear relative to the one or more planetary gears.

In addition to one or more of the features described above or below, or as an alternative, further embodiments could include wherein the ring gear actuator comprises a brake system selectively constraining rotation of the ring gear relative to the one or more planetary gears.

In addition to one or more of the features described above or below, or as an alternative, further embodiments could include wherein the ring gear actuator comprises at least one worm gear.

In addition to one or more of the features described above or below, or as an alternative, further embodiments could include at least one motor generator operatively coupled to the at least one worm gear.

In addition to one or more of the features described above or below, or as an alternative, further embodiments could include a controller operatively connected to the at least one motor generator, the controller selectively operating the at least one motor generator in a first mode, wherein the at least one motor generator drives the at least one worm gear to selectively adjust a speed of the ring gear relative to the one or more planetary gears and in a second mode, wherein the at least one motor generator drives the at least one worm gear to rotate the output member.

In addition to one or more of the features described above or below, or as an alternative, further embodiments could include a battery operatically connected to the motor generator.

Also disclosed is a method of operating a variable ratio gearbox assembly for a rotary wing aircraft. The method includes transmitting rotational energy from a prime mover to a main rotor shaft of a main rotor assembly, rotating the main rotor shaft at a first rotational speed, transmitting the rotational energy from the prime mover to a tail rotor shaft of a tail rotor assembly, and selectively rotating the tail rotor shaft at a second rotational speed that is distinct from the first rotational speed.

In addition to one or more of the features described above or below, or as an alternative, further embodiments could include wherein transmitting the rotational energy to the tail rotor shaft includes mechanically passing rotational energy to a variable ratio gearbox assembly having a differential gear set including a sun gear, at least one planetary gear, and a ring gear to the tail rotor shaft.

In addition to one or more of the features described above or below, or as an alternative, further embodiments could include wherein selectively rotating the tail rotor shaft at the second rotational speed, includes selectively rotating the ring gear relative to the at least one planetary gear.

In addition to one or more of the features described above or below, or as an alternative, further embodiments could include wherein selectively rotating the ring gear relative to the at least one planetary gear includes selectively applying a braking force to the ring gear.

In addition to one or more of the features described above or below, or as an alternative, further embodiments could include wherein selectively rotating the ring gear relative to the at least one planetary gear includes selectively activating a motor generator to operate one or more worm gears mechanically linked to the ring gear.

In addition to one or more of the features described above or below, or as an alternative, further embodiments could include rotating the tail rotor shaft at a third rotational speed through operation of the one or more worm gears.

In addition to one or more of the features described above or below, or as an alternative, further embodiments could include wherein selectively rotating the tail rotor shaft at the second rotational speed includes selectively rotating the tail rotor shaft at a speed that is lower than the first rotational speed, selectively rotating the tail rotor shaft at a speed that is greater than the first rotational speed and selectively rotating the tail rotor shaft at a speed that is substantially equal to the first rotational speed.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
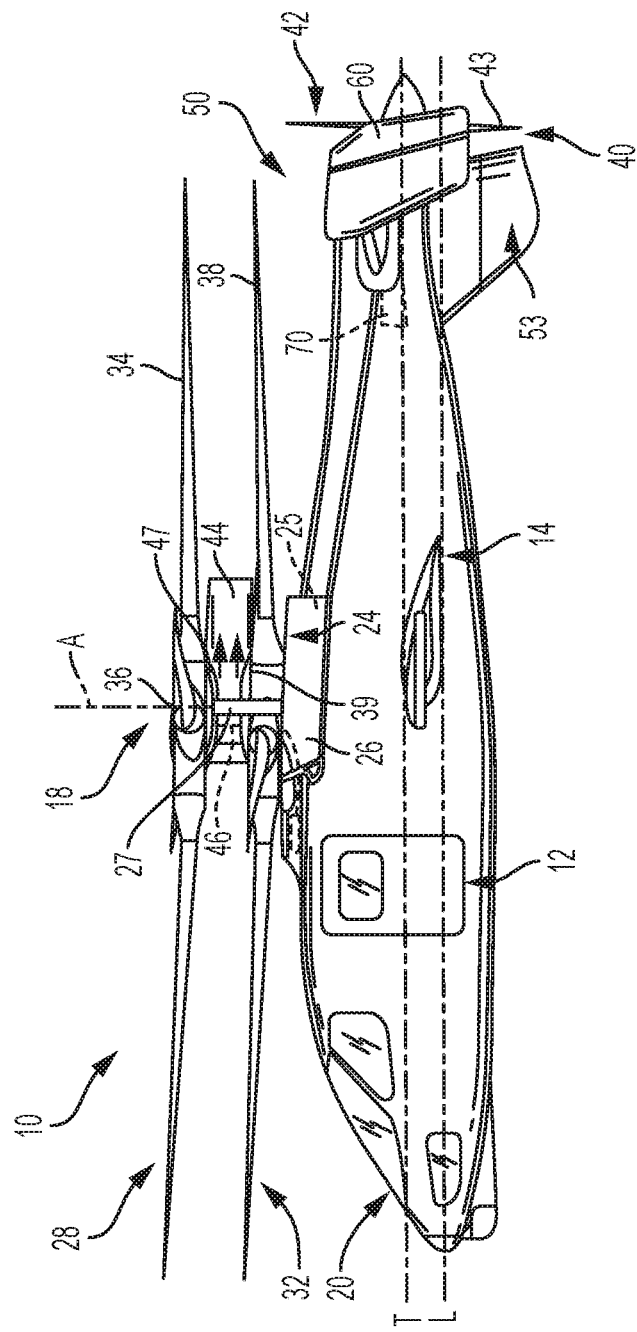
FIG. 1 depicts a rotary wing aircraft including a rotor assembly having a variable gear ratio differential, in accordance with an exemplary embodiment.
Figure 2:
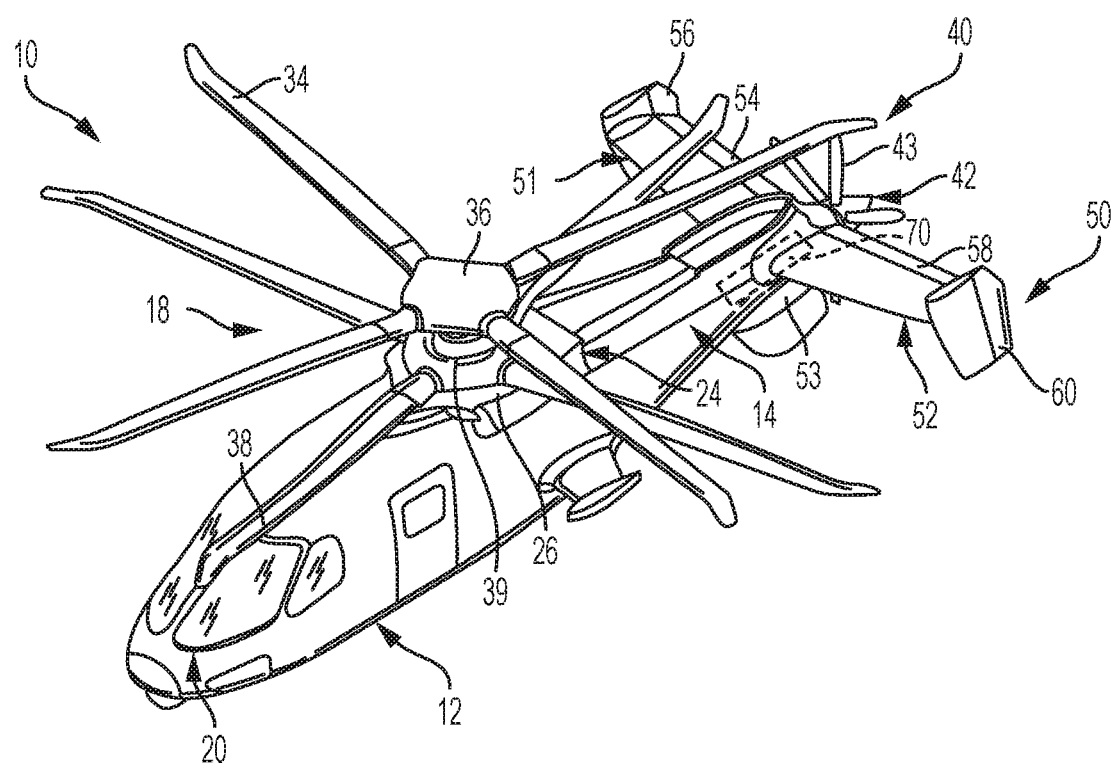
FIG. 2 is a perspective view of a rotary wing aircraft of FIG. 1, in accordance with an exemplary embodiment.

FIGS. 1 and 2 depict an exemplary embodiment of a rotary wing, vertical takeoff and landing (VTOL) aircraft 10. Aircraft 10 includes an airframe or fuselage 12 having a plurality of surfaces (not separately labeled) with an extending tail 14. A coaxial main rotor assembly 18 is located at the fuselage 12 and rotates about a main rotor axis, A. In an exemplary embodiment, the fuselage 12 includes a cockpit 20 having two seats for flight crew (e.g., pilot and co-pilot) and six seats for passengers (not shown). Main rotor assembly 18 is driven by a prime mover 24, for example, one or more engines 25, via a gearbox 26. It is to be understood that prime mover 24 may take on various forms. Main rotor assembly 18 may be operatively coupled to gear box 26 through at least one main rotor shaft indicated generally at 27.

Main rotor assembly 18 includes an upper rotor assembly 28 that may be driven in a first direction (e.g., counter-clockwise) about the main rotor axis, A, and a lower rotor assembly 32 that may be driven in a second direction (e.g., clockwise) about the main rotor axis, A, opposite to the first direction (i.e., counter rotating rotors). Of course, it should be understood that upper and lower rotor assemblies 28 and 32 may be driven in the same direction.

In accordance with an exemplary embodiment, upper rotor assembly 28 includes a first plurality of rotor blades 34 supported by a first or upper rotor hub 36. Lower rotor assembly 32 includes a second plurality of rotor blades 38 supported by a second or lower rotor hub 39. In some embodiments, aircraft 10 may include a auxiliary propulsion assembly an auxiliary propulsion assembly 40 that may take the form of a tail rotor assembly 42 located at extending tail 14 to provide translational thrust (forward or rearward) for aircraft 10. Tail rotor assembly 42 includes a plurality of tail rotor blades 43. In the exemplary embodiment shown, tail rotor assembly 42 provides forward and or reverse thrust. However, it should be understood that aircraft 10 may be provided with a tail rotor assembly that provides yaw control.

Main rotor assembly 18 also includes a shaft fairing 44 generally located between and around the upper and lower rotor assemblies 28 and 32 such that lower rotor hub 39 may be at least partially contained therein. Shaft fairing 44 extends about a rotor shaft 46 operatively connecting upper rotor assembly 28 and prime mover 24. Shaft fairing 44 extends between lower rotor hub 39 and an upper hub member 47 arranged inwardly of upper rotor assembly 28 and operates to reduce drag which might otherwise exist at rotor shaft 46. First plurality of rotor blades 34 may be connected to upper rotor hub 36 in a hingeless manner, also referred to as a rigid rotor system. Similarly, second plurality of rotor blades 38 may be connected to lower rotor hub 39 in a hingeless manner. Although a particular aircraft configuration is illustrated in this non-limiting embodiment, other rotary wing aircraft will also benefit from embodiments of the invention. Although, the dual rotor system is depicted as coaxial, embodiments could also include other main rotor and tail rotor configurations. Moreover, aspects can be used in non-rotary wing aircraft, including fixed wing aircraft and tilt wing aircraft using rotor blades and/or propellers, and can be used in maritime propulsion systems, wind turbines and the like. Additionally, geared turbofans having a gearbox between engine output members and an axial fan shaft may also benefit from the exemplary embodiments.

Tail rotor assembly 42, is connected to, and driven by, prime mover 24 via the gearbox 26. Auxiliary propulsion assembly 40 may be mounted to the rear of the fuselage 12 with a translational thrust axis, T, oriented substantially horizontal and parallel to the aircraft longitudinal axis, L, to provide thrust for high-speed flight. The term "parallel" should be understood to include a translational thrust axis that is coincident with the longitudinal axis. Translational thrust axis, T, corresponds to the axis of rotation of tail rotor assembly 42. While shown in the context of a pusher-prop configuration, it is understood that the auxiliary propulsion assembly 40 could also be a more conventional tail rotor assembly oriented to provide yaw control in addition to, or instead of, translational thrust. It should be further understood that any such system or other auxiliary propulsion assembly may alternatively or additionally be utilized. Alternative auxiliary propulsion assemblies may include different propulsion forms, such as a jet engine. In accordance with an aspect of an exemplary embodiment, tail rotor blades may include a variable pitch. More specifically, the pitch of tail rotor blades 43 may be altered to increase or decrease the thrust or to change the direction of thrust (e.g., forward or rearward).

In accordance with another aspect of an exemplary embodiment, extending tail 14 includes a tail section 50 including starboard and port horizontal stabilizers 51 and 52. Tail section 50 also includes a vertical stabilizer 53 that extends downward from extending tail 14. Starboard horizontal stabilizer 51 includes a starboard active elevator 54 and a starboard active rudder 56. Similarly, port horizontal stabilizer 52 includes a port active elevator 58 and a port active rudder 60. Elevators 54 and 58 and rudders 56 and 60 act as controllable surfaces, e.g., surfaces that alter a flight path/characteristics of aircraft 10.

In accordance with an exemplary embodiment, aircraft 10 includes a variable ratio gearbox assembly 70 mechanically linking gearbox 26 and tail rotor assembly 42. As will become more fully evident below, variable ratio gearbox 70 provides enhanced control of a rotational speed of tail rotor blades 43. Tail rotor blades 43 may be rotated at a 1:1 ratio with first and second pluralities of rotor blades 34 and 38, at a rotational speed less than the rotational speed of first and second pluralities of rotor blades 34 and 38, and/or at a rotational speed that is greater than the rotational speed of first and second pluralities of rotor blades 34 and 38.

Figure 3:
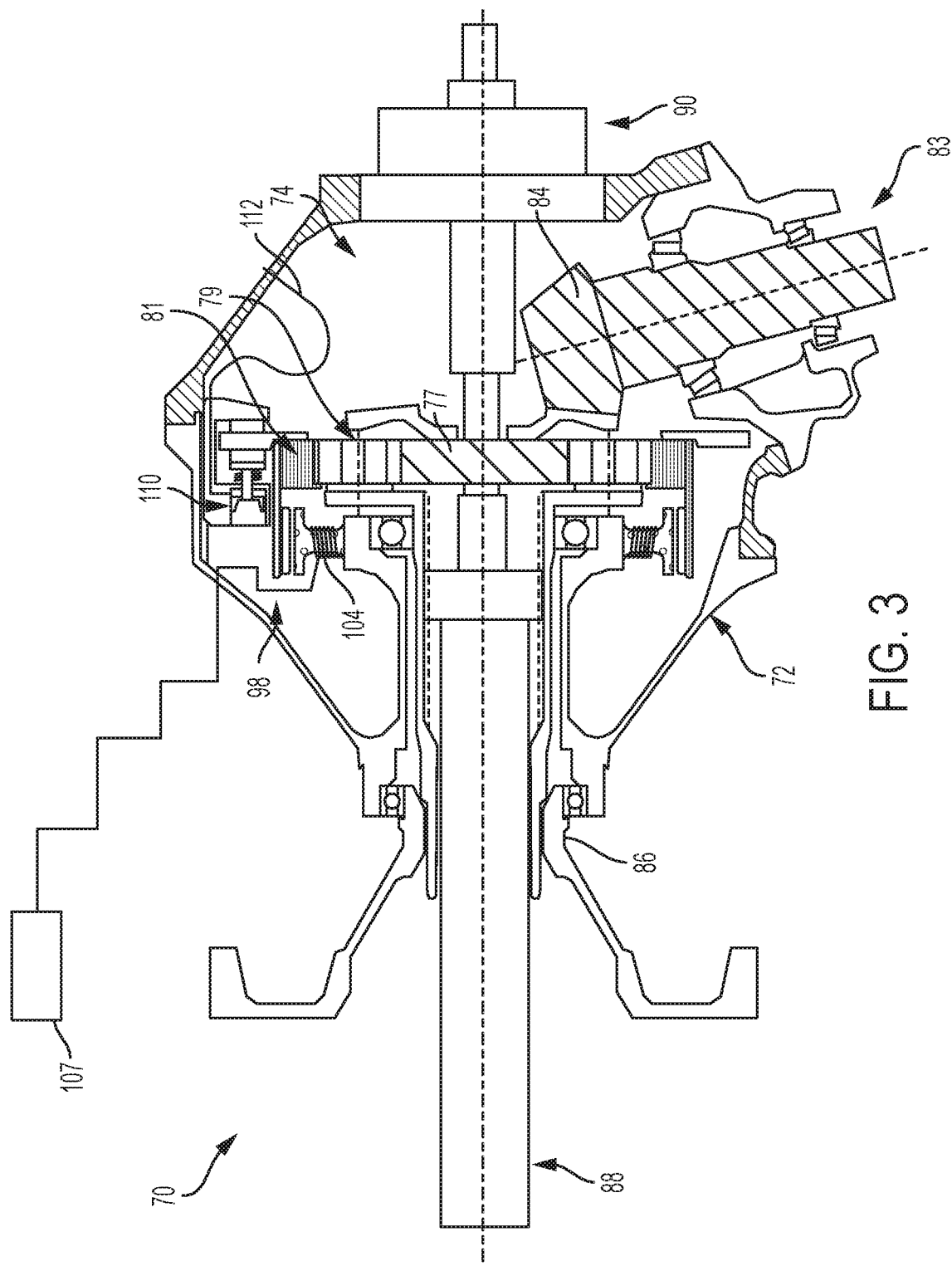
FIG. 3 is a schematic illustration of the variable gear ratio differential including a ring gear actuator, in accordance with an aspect of an exemplary embodiment.

In accordance with an aspect of an exemplary embodiment illustrated in FIG. 3, variable ratio gearbox 70 includes a housing 72 that surrounds a differential gear set 74 having a sun gear 77, a plurality of planetary gears, one of which is indicated at 79, and a ring gear 81. A tail rotor shaft 83 includes an input gear or pinion 84 that is mechanically linked to gearbox 26 and provides input power/torque to tail rotor assembly 42 through sun gear 77. An output shaft 86 may take the form of a planet carrier and is coupled to a pitch change shaft 88 that provides control input to the plurality of tail rotor blades 43. The control input may increase, decrease, or reverse rotor thrust. Housing 72 also supports a flight control actuator 90 that selectively adjusts various aspects of the plurality of tail rotor blades 43 based on inputs received through a control device, such as an inceptor.

In accordance with an aspect of an exemplary embodiment variable ratio gearbox 70 may also include a ring gear actuator 98 that selectively adjusts a ratio of ring gear 81 relative to planetary gears 79. By changing a relative speed of ring gear 81 and planetary gears 79 output shaft 86 may rotate at a speed that is different than main rotor shaft 27 driving first and second pluralities of rotor blades 34 and 38. In accordance with the exemplary aspect shown, ring gear actuator 98 may take the form of a motor generator 104 operatively coupled to a brake 110 having a hydraulic supply 112. Motor generator 104 may be selectively operated as a braking system that generates a braking force to control a rotational speed of ring gear 82.

A controller 107 selectively activates motor generator 104 to establish speed and direction, as well as a desired application (electromagnetic braking) force of to ring gear 81. With either motor generator 104 or redundant break 110 fully engaged, ring gear 81 does not move and rotational energy input through input gear 84 and rotational energy output through output shaft 86 is at a 1:1 ratio. Allowing ring gear 81 to slip by adjusting a rotational speed of motor generator 104 in a direction opposing a direction of rotation of output shaft 86 causes output shaft 86 to rotate at a speed that is lower than that would otherwise be the case with ring gear 81 held stationary. Conversely, operating motor generator 104 in a direction similar to the direction of rotation of output shaft 88 causes the output speed to increase over that which would otherwise be the case with ring gear 81 held stationary. In addition to motor generator 104, variable ratio gearbox 70 includes a secondary brake 110 that will fully engage ring gear 81 in a failure mode. That is, in the event a failure occurs in motor generator 104, secondary brake 110 is activated to apply a braking force thereby ensuring ring gear 81 is fully engaged and remains stationary.

Figure 4:
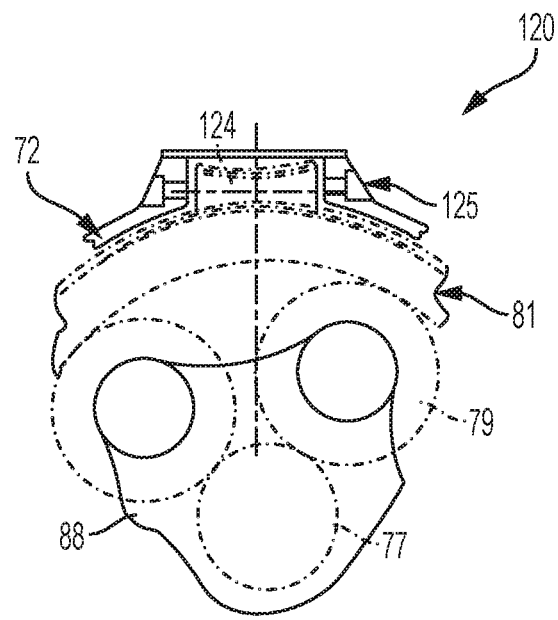
FIG. 4 is a schematic illustration of a portion of the variable gear ratio differential including a ring gear actuator, in accordance with another aspect of an exemplary embodiment.
Figure 5:
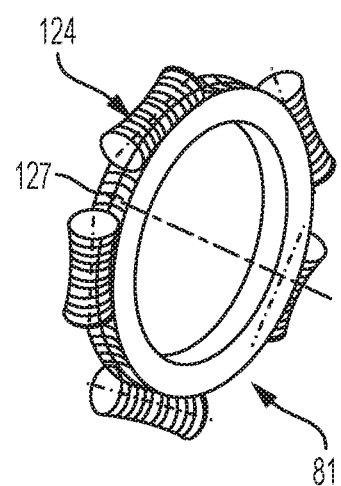
FIG. 5 is a partial perspective view of a portion of the ring gear actuator of FIG. 5.
Figure 6:
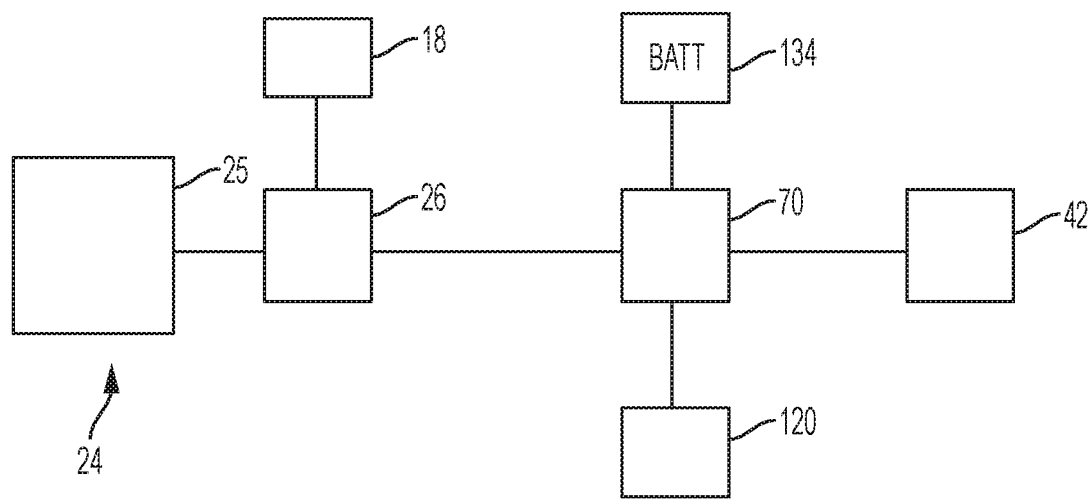
FIG. 6 is a block diagram illustrating the variable gear ratio differential connected to a prime mover and a tail rotor assembly, in accordance with an exemplary embodiment.

Reference will now follow to FIGS. 4 and 5, wherein like reference numbers represent corresponding parts in the respective views, in describing a ring gear actuator 120 in accordance with another aspect of an exemplary embodiment. Ring gear actuator 120 includes one or more worm gear members 124 mechanically connected to housing 72 and engaging ring gear 81. Worm gear members 124 are operatively connected to one or more motor generators 125. Ring gear 81 includes an outer annular surface (not separately labeled) having one or more gear teeth 127 that meshingly engage with worm gear 124

Motor generators 125 rotate worm gear members 124 to establish a desired speed of ring gear 81 relative to planetary gears 79. Ring gear 81 speed may be adjusted to establish a first mode, wherein tail rotor blades 43 rotate at a speed that is less than what would otherwise occur with a fixed speed ratio of first and second pluralities of rotor blades 34 and 38. In a second mode, in which the rotational speed of tail rotor blades 43 is greater than what would otherwise occur with a fixed speed ratio of first and second pluralities of rotor blades 34 and 38. In a third mode, wherein the rotational speed of tail rotor blades 43 substantially equals what would otherwise occur with a fixed speed ratio of first and second pluralities of rotor blades 34 and 38.

In accordance with an aspect of an exemplary embodiment, a battery may be connected to variable ratio gearbox 70. Battery 134 may provide power to motor generators 125 sufficient to rotate output shaft 86 in the event of a loss of mechanical input power. Additionally, it is to be understood that acting as a generator motor generators 105 and/or 125 may feedback power to supplement electrical power being generated by main rotor assembly 18. Further, it is also to be understood that acting as a motor, motor generators 104 and/or 125 may off-load main gearbox load demand. In the above manner, motor generators 104 and/or 125 may provide an additional 5%-10% power during spin up or other operating modes. Examples of operational situations where such power insertion might be beneficial could include critical response to engine failure, critical addition of power to recover low rotor rpm during transient response to rapid power demands, application of additional power during the touchdown phase of an autorotative emergency landing. It should also be understood that the use of variable ratio gearbox 70 may increase an overall maximum payload for aircraft 10.

Figure 7:
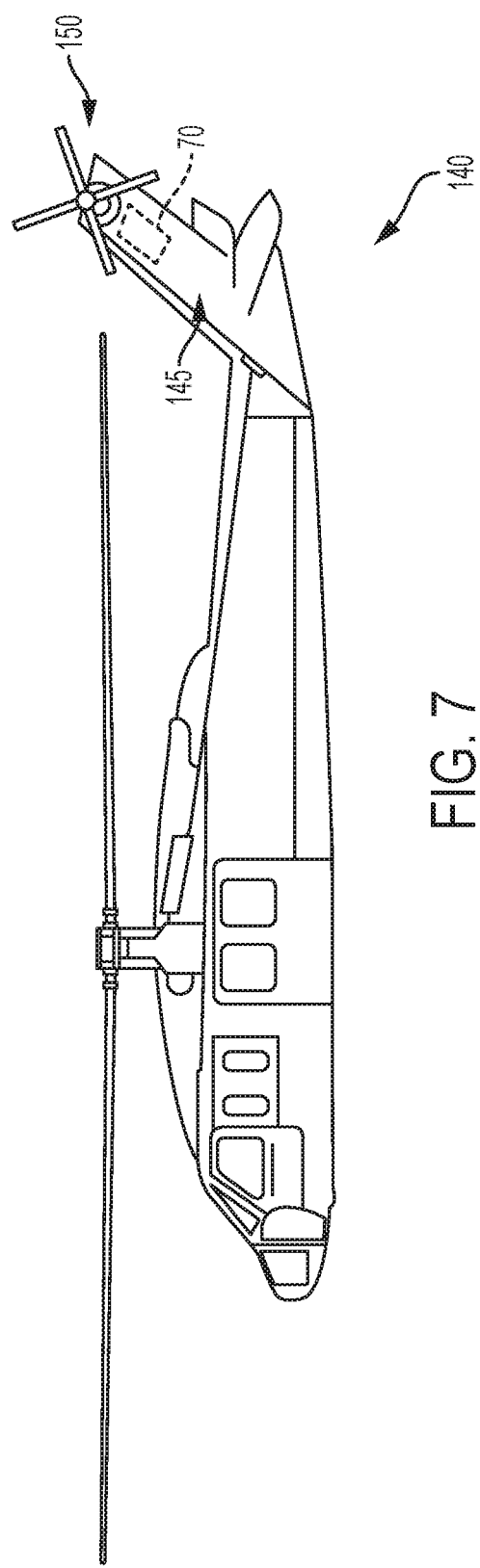
FIG. 7 depicts a rotary wing aircraft including the variable gear ratio differential, in accordance with another exemplary embodiment.

It is to be understood that variable ratio gearbox 70 may be incorporated into a wide range of rotary wing aircraft. For example, variable ratio gearbox 70 may be incorporated into a rotary wing aircraft 140 illustrated in FIG. 7. Rotary wing aircraft 140 includes a tail section 145 and a tail rotor assembly 150 that provides attitude control. Variable ratio gearbox 70 provides selective speed control for tail rotor assembly 150.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotary wing aircraft comprising:
    a prime mover;
    a main rotor assembly including a first plurality of rotor blades operatively coupled to a main rotor shaft rotatable at a first speed;

a tail rotor assembly including a second plurality of rotor blades operatively coupled to a tail rotor shaft rotatable at a second speed that selectively provide translational thrust for the rotary wing aircraft; and a variable ratio gearbox assembly mechanically connected to at least the tail rotor shaft, the variable ratio gearbox assembly including a housing surrounding a variable ratio gear set having a ring gear, the variable ratio gear set operating to selectively vary the second speed relative to the first speed;

a motor generator operatively connected to the ring gear, the motor generator defining a primary brake system operable to selectively constrain movement of the ring gear; and a secondary brake system operable to constrain movement of the ring gear in the event the motor generator is not used to constrain the ring gear.

2. The rotary wing aircraft according to claim 1, wherein the variable ratio gear set includes a planetary gear set having a sun gear, one or more planetary gears, and an output member.

3. The rotary wing aircraft according to claim 2, wherein, the motor generator comprises a ring gear actuator, the ring gear actuator selectively enabling movement of the ring gear relative to the one or more planetary gears.

4. The rotary wing aircraft according to claim 3, wherein the ring gear actuator comprises at least one worm gear.

5. The rotary wing aircraft according to claim 4, further comprising: a controller operatively connected to the motor generator, the controller selectively operating the motor generator in a first mode, wherein one motor generator drives the at least one worm gear to selectively adjust a speed of the ring gear relative to the planetary gear set and in a second mode, wherein the motor generator drives the at least one worm gear to rotate the output member.

6. The rotary wing aircraft according to claim 5, wherein the controller selectively activates the motor generator to constrain movement of the ring gear.

7. The rotary wing aircraft according to claim 6, wherein the controller is operatively coupled to the secondary brake system.

8. The rotary wing aircraft according to claim 1, further comprising: a battery operatively connected to the motor generator.

9. A method of operating a variable ratio gearbox assembly for a rotary wing aircraft comprising:

transmitting rotational energy from a prime mover to a main rotor shaft of a main rotor assembly;

rotating the main rotor shaft at a first rotational speed;

transmitting the rotational energy from the prime mover to a tail rotor shaft of a tail rotor assembly through a variable ratio gear box assembly;

selectively rotating the tail rotor shaft at a second rotational speed that is distinct from the first rotational speed to provide translational thrust for the rotary wing aircraft; and selectively activating a motor generator defining a primary braking system to apply a braking force to the ring gear; and selectively applying another braking force to the ring gear through a secondary braking system in the event the motor generator is not used to constrain the ring gear.

10. The method of claim 9, wherein transmitting the rotational energy to the tail rotor shaft includes mechanically passing rotational energy to a differential gear set arranged in the variable ratio gearbox assembly, the differential gear set including a sun gear, at least one planetary gear, and a ring gear to the tail rotor assembly.

11. The method of claim 10, wherein selectively rotating the tail rotor shaft at the second rotational speed, includes selectively rotating the ring gear relative to the at least one planetary gear.

12. The method of claim 11, wherein selectively rotating the ring gear relative to the at least one planetary gear includes selectively activating a motor generator to operate one or more worm gears mechanically linked to the ring gear.

13. The method of claim 12, further comprising: rotating the tail rotor shaft at a third rotational speed through operation of the one or more worm gears.

14. The method of claim 10, wherein selectively applying a braking force includes controlling the motor generator to prevent rotation of the ring gear.

15. The method of claim 9, wherein selectively rotating the tail rotor shaft at the second rotational speed includes selectively rotating the tail rotor shaft at a speed that is lower than the first rotational speed, selectively rotating the tail rotor shaft at a speed that is greater than the first rotational speed and selectively rotating the tail rotor shaft at a speed that is substantially equal to the first rotational speed.

16. The method of claim 9, further comprising: adjusting a pitch of tail rotor blades operatively connected to the tail rotor shaft through a flight control actuator supported by the variable ratio gear box assembly.

* * * * *